Dec. 15, 1964     H. E. RIORDAN ETAL     3,161,065
ORBITAL DRAG METER

Filed Jan. 7, 1963                                                  4 Sheets—Sheet 1

HUGH E. RIORDAN
WALTER M. CAROW
INVENTORS

BY S. A. Giarratana
Francis L. Masselle

ATTORNEYS

Dec. 15, 1964    H. E. RIORDAN ETAL    3,161,065
ORBITAL DRAG METER
Filed Jan. 7, 1963    4 Sheets-Sheet 2
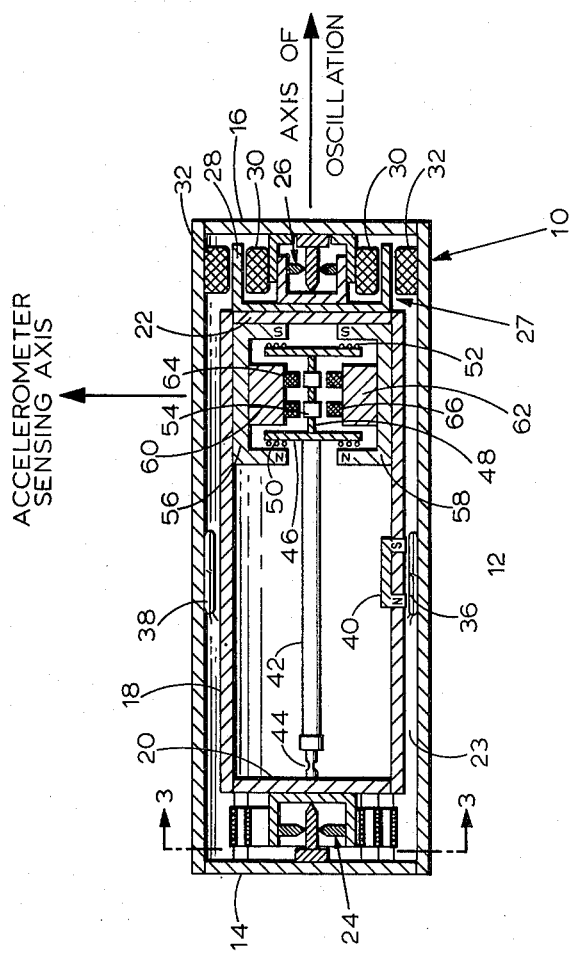
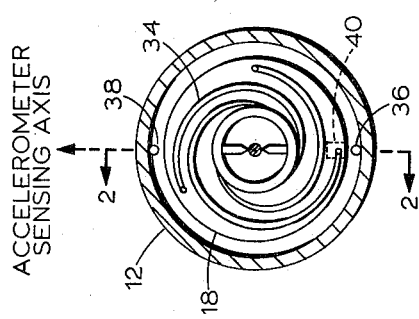
HUGH E. RIORDAN
WALTER M. CAROW
INVENTORS
BY S. A. Giarratana
Francis L. Masselle
ATTORNEYS Dec. 15, 1964   H. E. RIORDAN ETAL   3,161,065
ORBITAL DRAG METER
Filed Jan. 7, 1963   4 Sheets-Sheet 4

HUGH E. RIORDAN
WALTER M. CAROW
INVENTORS

BY S. A. Giarratana
Francis L. Masselle
ATTORNEYS

United States Patent Office 3,161,065
Patented Dec. 15, 1964

3,161,065
ORBITAL DRAG METER
Hugh E. Riordan, Wyckoff, and Walter M. Carow, West Orange, N.J., assignors to General Precision Inc., Little Falls, N.J., a corporation of Delaware
Filed Jan. 7, 1963, Ser. No. 249,653
13 Claims. (Cl. 73—516)

The present invention relates to accelerometers, and more particularly to an inertial accelerometer for measuring the very low level acceleration of an orbiting vehicle.

The earth's atmosphere extends out to orbital altitudes in extremely tenuous form, but it is still significant enough to produce drag on orbiting vehicles. Observation of such vehicles as the Echo balloon satellites have shown relatively poor correlation with computed aerodynamic drag based on calculations from sounding rocket data. Other phenomena, such as radiation bombardment from the sun, and the presence of interplanetary matter and magnetic effects, may have a significant effect on drag in orbit. A direct measurement of the acceleration of an orbiting vehicle in the absence of deliberately applied forces is therefore of interest. It is estimated that such drag accelerations may be in the order of $10^{-6}$ g. In order that any periodic variations in drag be observable, it is necessary that the stability of the measurement extend over days or months. Prior to the present invention, suitable accelerometers were not available having the requisite null stability. Gravimeters used in geophysical work have been built with null stability approaching the required value, but such instruments are either excessively large or extremely fragile, or both.

In accordance with the present invention, the null variations in a conventional sensitive force balance accelerometer are cancelled by mounting the accelerometer on an oscillating supporting body. The axis of oscillation or rotation is normal to the direction in which acceleration is to be sensed and normal to the sensing axis of the accelerometer. The output of the accelerometer consists of a steady component representing the bias of the instrument, and a varying component having an amplitude equal to the acceleration to be measured. By oscillating the supporting body rather than rotating it, flex leads may be used to make the necessary electrical connections and thus eliminate the necessity of slip rings.

Accordingly, it is one object of the invention to improve the measurement of very low level accelerations in the presence of accelerometer bias.

It is another object of the invention to provide an accelerometer which can employ a stiff suspension to accommodate severe environments, such as occur during a missile launch, without limiting the low level acceleration measuring capability of the accelerometer.

It is a further object of the invention to improve the null stability and sensitivity of a conventional force balance accelerometer by mounting the accelerometer on an oscillating supporting body.

It is a further object of the invention to provide an oscillating accelerometer of the type described above having an increased output scale factor obtained by restricting the range of measurement of the accelerometer while maintaining the null stability and sensitivity of the accelerometer.

It is a still further object of the invention to provide an oscillating accelerometer of the type described above which cancels null shift and bias so that the accelerometer can be operated intermittently to measure the acceleration of an orbiting vehicle and thus use less electrical power than prior accelerometers which had to be operated continuously during the entire orbital period.

It is a still further object of the invention to provide an oscillating accelerometer of the type described above which can sense acceleration along a primary axis perpendicular to the axis of oscillation of the accelerometer and can also sense acceleration along an axis perpendicular to the primary axis and the axis of oscillation.

Further objects and features of novelty of the present invention will be specifically pointed out or will otherwise become apparent when referring, for a better understanding of the invention, to the following description taken in conjunction with the accompanying drawings, wherein:

FIG. 2 is a sectional view taken along the line 2—2 of FIG. 1;

FIG. 3 is a sectional view taken along the line 3—3 of FIG. 2;

Figure 1:
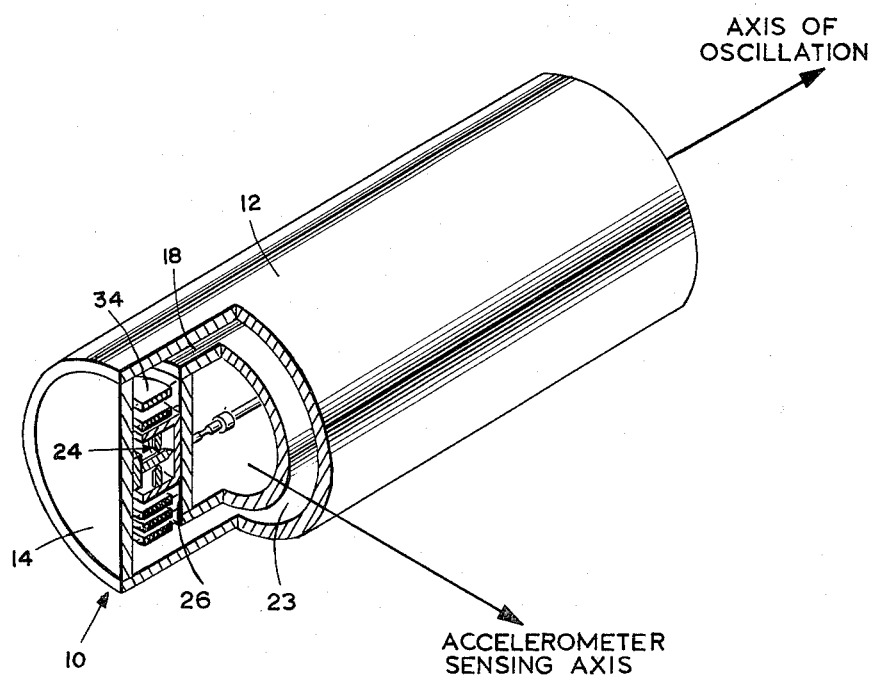
FIG. 1 is a perspective view partially broken away illustrating one embodiment of the invention.

Referring to FIGS. 1–3, a force balance accelerometer 10 is shown which illustrates one embodiment of the present invention. The accelerometer 10 comprises a cylindrical housing 12 enclosed by end walls 14 and 16. A cylindrical float 18 enclosed by end walls 20 and 22 is positioned within the housing 12. Conventional gyrotype jewel and pivot assemblies 24 and 26 center the float 18 within the housing 12 and the space 23 between the housing 12 and the float 18 is filled with a suitable flotation fluid, such as a high-density fluorocarbon oil. The buoyancy of the float 18 is adjusted to provide sufficient support during missile boost acceleration to prevent damage to the pivots and jewels.

A drag cup torquer 27 is provided for oscillating the float 18. It comprises a drag cup 28 mounted on one end of the float 18 and driven by a 400 c.p.s. stator structure having inner and outer stator coils 30 and 32 fixed to the housing 12 on opposite sides of the cylindrical wall of the drag cup 28. The drag cup torquer oscillates the float 18 through an angle in excess of 180°, as will be described in greater detail hereinafter, and preferably at a rate of about 0.25 radian per second. A plurality of flexleads 34 are positioned about the jewel and pivot assembly 24 to make the necessary electrical connections to the float 18. One end of each flexlead 34 is connected to the float 18 and the other end of each of the flexleads is connected to the housing 12.

A pair of conventional reed switches 36 and 38 are fixed within the cylindrical housing 12 parallel to the axis of the housing in position to cooperate with a small permanent magnet 40 fixed in the cylindrical float 18 and having the north and south poles thereof flush with the outer surface of the float. When the magnet is in the position illustrated in FIGS. 2 and 3, the flux between the north and south poles passes through the magnetizable reeds of the reed switch 36 to pull them together and close the circuit through the switch. This provides a signal which is applied to the torquer 27, as will be described, to reverse the direction of rotation of the float 18 to a counterclockwise direction as viewed in FIG. 3. The magnet 40 rotates toward the reed switch 38 which is positioned over 180° from the reed switch 36, the angle between the reed switches preferably being about 200°. When the permanent magnet 40 is aligned with the reed switch 38, it closes a circuit through the switch to again reverse the drag cup torquer and rotate the float 18 in a clockwise direction as viewed in FIG. 3. By oscillating the float 18 through more than 180° in this manner a full reversal of the accelerometer sensing axis is insured and the reversal transient is permitted to decay fully while the instrument is not at the reading positions. The reading positions are defined as those positions lying between and including the two 180° angular positions in which the accelerometer sensing axis is aligned with the primary acceleration input axis.

The use of jewel bearings, a floated mounting of the accelerometer and a drag cup torquer help assure the absence of "jitter" or vibration which might otherwise be associated with the oscillatory motion. Such jitter or vibration might obscure the accelerations which are to be measured.

The housing 12 is also provided with a heater, temperature sensors, and a heat shield to provide a high precision temperature control. Since these elements are conventional, they have not been shown in the drawings. The acceleration is detected by a pendulum 42 mounted on a very precisely made flexure hinge 44 which is fixed to the end wall 20 of the float 18. The hinge enables the free end of the pendulum to pivot in either direction along the sensing axis. The pendulum 42 has a cylindrical aluminum proof mass structure 46 on the free end thereof which includes a partition 48 dividing the proof mass into two halves. A dual loudspeaker type force coil having separated windings 50 and 52 is carried on the proof mass and the partition 48 carries the secondary 54 of an air-core differential transformer pickoff. A pair of permanent magnets 56 and 58 cooperate with magnetic permeable pieces 60 and 62 to immerse the force coil windings 50 and 52 in a magnetic field of high density and stability. Through careful design, a high degree of linearity of the force generator provided by the force coils and permanent magnets can be achieved. A pair of primary coils 64 and 66 are mounted on the magnetic permeable pieces 60 and 62, respectively, to complete the air-core differential transformer pickoff.

With this construction, a servo loop can be employed to generate most of the restoring force which resists the action of the applied acceleration on the proof mass 46. The force exerted on the pendulum is directly proportional to the current in the force coil windings which, in turn, are controlled by the pickoff.

Figure 4:
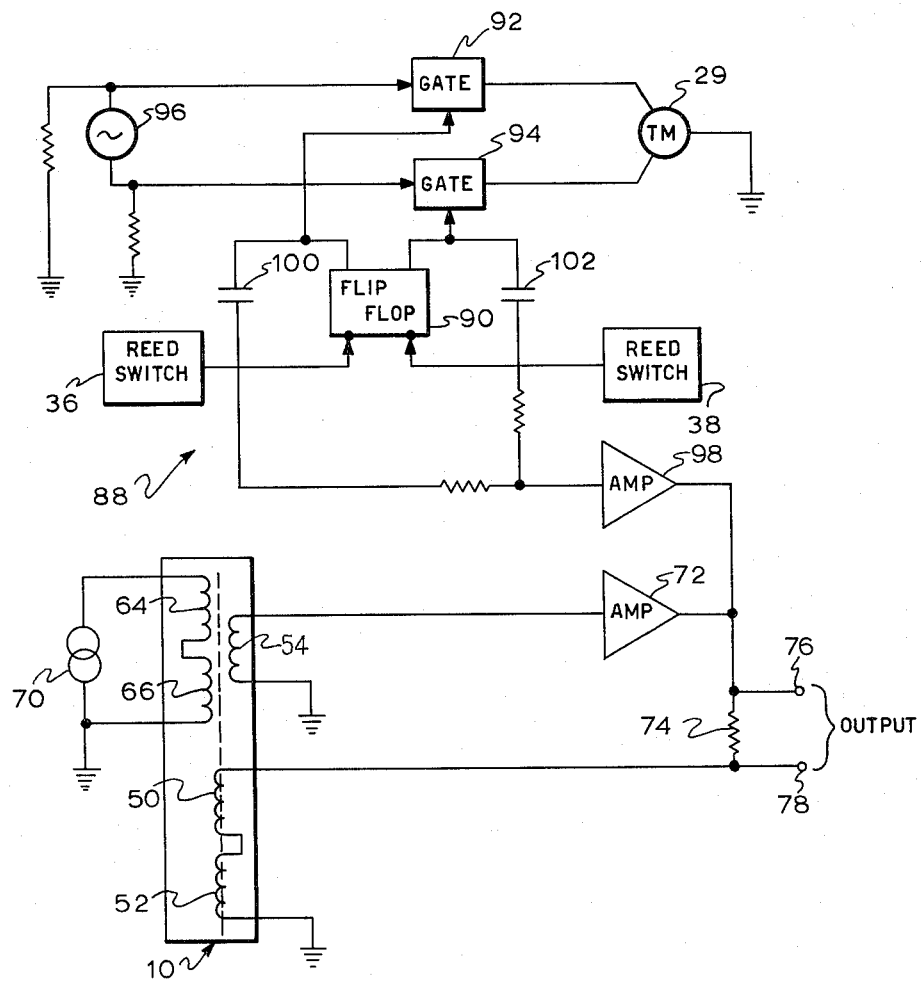
FIG. 4 is a schematic diagram of the electrical circuit for operating the accelerometer illustrated in FIG. 1.

Referring to FIG. 4, a schematic diagram of a circuit for operating the accelerometer 10 is illustrated. It comprises an A.C. source 70 for energizing the pickoff primary coils 64 and 66. The signal from the pickoff secondary coil 54 is applied to a high gain A.C. to D.C. amplifier 72, and the D.C. output of the amplifier 72 is passed through a reference resistor 74 and then through the force coil windings 50 and 52. With this arrangement, the force exerted on the proof mass 46 is directly proportional to the current in the force coil and tends to drive the pendulum in a direction to reduce the output of the pickoff secondary coil 48 to zero. The reference resistor 74 produces a voltage drop across the terminals 76 and 78 proportional to the current in the force coil, and this voltage drop is the output of the accelerometer.

Figure 5:
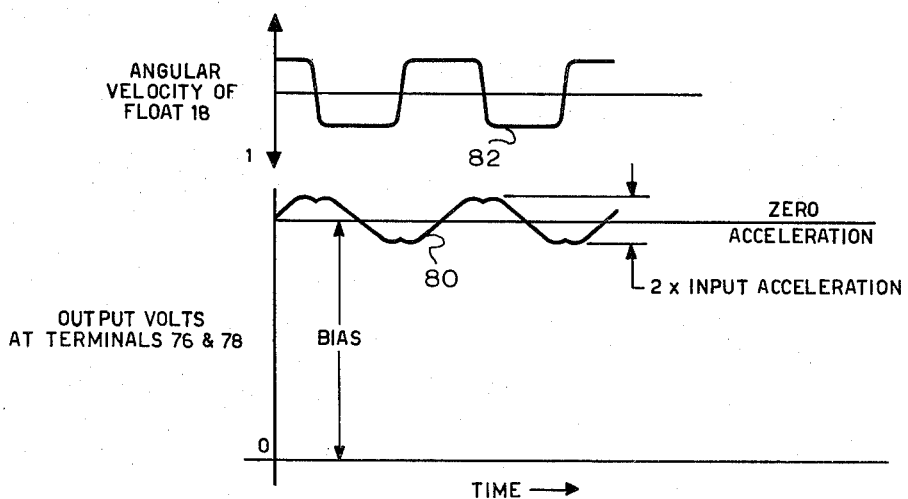
FIG. 5 is a graph of typical float angular velocity and acceleration signal traces for the accelerometer illustrated in FIG. 1.

Referring to FIG. 5, a typical one axis acceleration signal trace 80 which is obtained from the output terminals 76 and 78 is shown, along with a typical float angular velocity trace 82. It will be observed from the trace 80 that the positive and negative peak amplitudes have what may be called a double crest which occurs each time the direction of oscillation of the float 18 reverses itself. This is due to the fact that the float 18 reaches the extreme of its angular travel approximately 10° beyond the reading positions so that the reversal transient can decay fully while the instrument is not at the reading positions. The zero acceleration level is defined as the mid point between the modulation peaks of the trace 80, and the input acceleration is proportional to one-half the double amplitude of the modulation envelope. Of course when obtaining one axis information in this manner, the accelerometer is oriented so that its sensing axis is aligned with the input axis at each of the angular positions at which modulation peaks occur.

Figure 6:
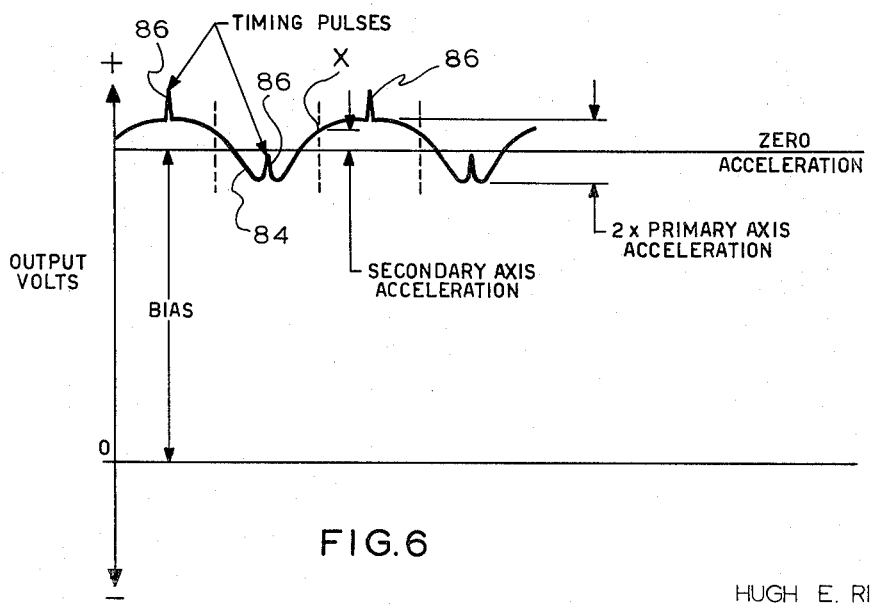
FIG. 6 is a graph of the acceleration output signal with timing pulses imposed thereon to enable two-axis information to be obtained.

Referring to FIG. 6, if we assume that components of acceleration input exist along the input axis previously discussed, which may be referred to as the primary input axis, and along a secondary input axis normal to both the primary input axis and the axis of oscillation of the float 18, the output trace would resemble the trace 84 illustrated in FIG. 6. The acceleration along the primary input axis is proportional to one-half the double amplitude of the modulation envelope. The acceleration along the secondary axis is proportional to the distance between a point X on the modulation trace and the zero acceleration level, the point X lying midway between two timing pulses 86 which, as will be described in greater detail hereinafter, are superimposed on the modulation peaks of the trace 84 each time the float 18 reverses its direction of oscillation. With this arrangement a single accelerometer 10 can provide two-axis information by selectively reading the acceleration along the primary and secondary axes on a time sharing basis.

Since the reed switches 36 and 38 control the reversal of the direction of oscillation of the float 18, they provide a convenient means for controlling the generation of the timing pulses 86. One suitable circuit for producing the timing pulses in response to the actuation of the reed switches is illustrated in the portion of FIG. 4 not previously described. In this circuit the reed switches 36 and 38 are connected to a flipflop 90 which is in one state when the reed switch 36 is actuated and in its other state when the reed switch 38 is actuated. When in its one state, the flip-flop 90 enables a gate 92 and when in its other state, it enables a gate 94. The gates 92 and 94 are connected in parallel between an alternating source 96 and one side of the drag cup torquer 27 so that when either gate is enabled a circuit will be completed to energize the torquer 27. When the circuit is completed through the gate 92, the torquer rotates the float 18 in one direction, and when it is completed through the gate 94, the torquer rotates the float in the opposite direction. As mentioned previously, the alternating source 96 is preferably a 450 c.p.s. source. Each time the reed switch 36 is actuated to change the flip-flop 90 to its one state, a pulse is transmitted to the amplifier 98 through the capacitor 100, and each time the reed switch 38 is actuated to change the flipflop to its other state, a pulse is transmitted through the capacitor 102 to apply a pulse to the amplifier 98. These pulses are amplified by the amplifier 98 and applied to the output of the amplifier 72 to provide the timing pulses 96 at the double crests of the trace 84 as mentioned in connection with FIG. 6.

As stated previously, the housing 12 is filled with flotation fluid to protect the jewel and pivot assemblies 24 and 26 and to regularize the oscillating movement of the float. The float is filled with low-density silicone fluid which provides the damping necessary to stabilize the servo loop between the pickoff and the force coil windings and helps to eliminate temperature gradients within the instrument.

The current scale factor of the accelerometer is defined as the current appearing in the force coil per gravity unit of acceleration. The flexture hinge 44, because it is frictionless and has very low elastic hysteresis, permits the exceptional resolution of the accelerometer. However, the flexure hinge has a spring rate which appears in the overall scale factor of the accelerometer. The servo loop can be considered to be an electrical spring since it produces a force on the proof mass 46 proportional to the displacement of the proof mass. Thus the steady state current scale factor of the accelerometer may be written as:

$$K_i = \frac{M_p G}{K_t} \left[ \frac{1}{\frac{K_h}{K_p K_a K_t} + 1} \right]$$

where:

$M_p$ = proof mass
$G$ = acceleration due to gravity
$K_t$ = torquer scale factor
$K_h$ = hinge spring rate
$K_p$ = pickoff scale factor
$K_a$ = amplifier gain For a typical sensitive accelerometer having a reference resistor of nominally 100,000 ohms, the current scale factor reduces to:

$$K_i = 5 \times 10^{-3} \left[ \frac{1}{3 \times 10^{-3} + 1} \right] \text{ amperes per "g"}$$

The voltage scale factor is the product of the current scale factor by the reference resistance, or very nearly 500 volts per g nominal. In practice, the value of the reference resistor will be trimmed to the accelerometer to bring the voltage scale factor to 500 plus or minus 0.1% volt per g.

If the accelerometer is to be used in the orbiting vehicle application mentioned previously, its output must be compatible with the telemetering system of the vehicle. A typical telemetering system accepts a full range input of plus or minus 5 volts. Typical conventional force balance accelerometers have an output scale factor of one volt per g. Thus at $10^{-6}$ g input, the output would be one microvolt, clearly below the threshold of practical telemetering systems. If an attempt is made to raise the effective output by amplification, the drift and gain stability of the amplifier will obscure the signal variations of interest. This problem is solved in the accelerometer 10 by restricting the range of measurement of the accelerometer and increasing the output scale factor. This is done by using a large reference resistor 74 of about 100,000 ohms, as mentioned previously.

In an orbiting vehicle, power economy is of great importance. Since the accelerometer 10 cancels null shift and bias, it is not necessary to provide for continuous operation or continuous high precision temperature control during the entire orbital period. The unit only need be turned on and the temperature stabilized at a time when a measurement is required. During operation, temperature stabilization to a set point value within plus or minus 5° of nominal operating temperature (155° F.) is required. Fluctuations about the set point must be limited to plus or minus 0.01° F. in the frequency band below 1 c.p.s. in order to avoid introducing output fluctuations which might be confused with the modulated acceleration signal. Temperature control of this quality is common practice and is readily obtainable. Between operating periods, the temperature can be allowed to fluctuate between −65° F. and +200° F. Warmup can be achieved from −65° F. in as little as five minutes if required.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. A force balance accelerometer comprising a supporting body, a proof mass movably mounted on said body for sensing acceleration along one axis, means for maintaining said proof mass at a null position, means for producing an electrical output proportional to the force required to maintain the proof mass at the null position, and means for oscillating said supporting body about an axis perpendicular to said one axis through an angle greater than 180°.

2. The invention as defined in claim 1 including flex leads for making the necessary electrical connections to said oscillating supporting body.

3. A force balance accelerometer comprising a supporting body, a pendulum having a proof mass on one end with the other end thereof hingeably mounted on said body to pendulously support said proof mass for sensing acceleration along a sensing axis, pickoff means for detecting the position of said proof mass, force applying means controlled by said pickoff means for applying a restoring force to the proof mass tending to maintain it in a null position, and means for oscillating said supporting body through an angle greater than 180° about an axis perpendicular to said sensing axis and passing through the point at which said other end of the pendulum is hingeably mounted on said supporting body.

4. The invention as defined in claim 3, including flex leads for making the necessary electrical connections to said pickoff means and force applying means.

5. The invention as defined in claim 3, wherein said means for oscillating said supporting body comprises a drag cup torquer for rotating said body in either direction, and means for reversing the direction of rotation of said drag cup torquer at predetermined extreme angular positions spaced apart from one another an angle greater than 180°.

6. A force balance accelerometer comprising a hollow supporting body, a pendulum having a proof mass on one end positioned within said supporting body, the other end of said pendulum being hingeably connected to said supporting body to pendulously support said proof mass for sensing acceleration along a sensing axis, pickoff means within said supporting body for detecting the position of said proof mass, force applying means within said supporting body controlled by said pickoff means for applying a restoring force to the proof mass tending to maintain it in a null position, a housing, means for oscillatably mounting said supporting body within said housing for oscillation about an axis perpendicular to said sensing axis and passing through the point at which said other end of the pendulum is hingeably connected to said supporting body, means within said housing for oscillating said supporting body through an angle greater than 180°, and flex leads for making the necessary electrical connections between said housing and supporting body.

7. The invention as defined in claim 6 wherein said means for oscillatably supporting said supporting body within said housing comprises a pair of jewel and pivot assemblies spaced from one another on the axis of oscillation and acting between said supporting body and housing.

8. The invention as defined in claim 7 including a flotation fluid filling said housing to float the supporting body within said housing in a manner to protect said jewel and pivot assemblies against severe acceleration environments.

9. The invention as defined in claim 6 wherein said last mentioned means comprises a drag cup mounted on said supporting body concentric with said axis of oscillation, and stator means mounted on said housing in position to cooperate with said drag cup to exert a torque thereon when energized, and including means for reversing the direction of rotation of said drag cup at predetermined extreme angular positions spaced apart from one another an angle greater than 180°.

10. The invention as defined in claim 9 wherein said last mentioned reversing means comprises magnetic means mounted on said supporting body for oscillation therewith, and a pair of magnetically actuated switches mounted within said housing in position to be actuated by said magnetic means, one of said switches being actuated when said body reaches one extreme of its angular travel and the other of said switches being actuated when said body reaches the other extreme of its angular travel, and circuit means for reversing the direction of rotation of said drag cup each time one of said switches is actuated by said magnetic means.

11. A force balance accelerometer comprising a cylindrical housing enclosed by a pair of spaced end walls, a cylindrical float enclosed by a pair of spaced end walls and positioned within said housing, means for oscillatably supporting said float within said housing for oscillation about the axes of the float and housing, a pendulum positioned within said float, said pendulum having a proof mass on one end thereof with the other end thereof connected to one end wall of said float by a flexure hinge to enable said proof mass to pivot about a pivot axis perpendicular to the axis of oscillation of said float in response to acceleration forces acting on the proof mass along a sensing axis perpendicular to the pivot axis and axis of oscillation, force coil means on said proof mass concentric with said sensing axis, permanent magnet means fixed within said float for producing a magnetic field extending radially through said force coil means, pickoff means for detecting the position of said proof mass comprising a secondary coil mounted on said proof mass and primary coils fixed with respect to said float on either side of said primary coil, said primary and secondary coils being coaxially aligned and concentric with said sensing axis, circuit means for controlling the restoring force applied by said force coil means in response to the output of said secondary coil in a manner to tend to maintain said proof mass in a null position, torquer means acting between said housing and float for oscillating said float through an angle greater than 180°, and flex leaves for making the necessary electrical connections between said housing and said float.

12. The invention as defined in claim 11, wherein said torquer means comprises a drag cup mounted on one end wall of said float concentric wtih the axis of oscillation, stator means mounted within said housing in position to cooperate with said drag cup to exert a torque thereon when energized, magnetic means mounted on said float for oscillation therewith, a pair of magnetically actuated switches mounted within said housing in position to be actuated by said magnetic means, one of said switches being actuated when said body reaches one extreme of its angular travel and the other of said switches being actuated when said float reaches the other extreme of its angular travel, and circuit means for reversing the direction of rotation of said drag cup each time one of said switches is actuated by said magnetic means.

13. A force balance accelerometer comprising a supporting body, a proof mass movably mounted on said body for sensing acceleration along one axis, means for maintaining said proof mass at a null position, means for producing an electrical output proportional to the force required to maintain the proof mass at the null position, means for oscillating said supporting body about an axis perpendicular to said one axis through an angle greater than 180°, means for generating a timing pulse each time said supporting body reaches an extreme angular position and reverses its direction of movement, and means for applying said timing pulses to said first mentioned means.

References Cited by the Examiner
UNITED STATES PATENTS

| | | | |
|---|---|---|---|
| 2,802,956 | 8/57 | Jarosh | 73—516 |
| 2,940,306 | 6/60 | Lozier | 73—517 |
| 3,014,374 | 12/61 | Johnston | 73—517 |
| 3,081,637 | 3/63 | Gevas | 73—517 |
| 3,101,003 | 8/63 | Lees | 73—517 |

FOREIGN PATENTS 791,827  3/58  Great Britain.

RICHARD C. QUEISSER, *Primary Examiner.*
JAMES J. GILL, *Examiner.*